United States Patent [19]

Bohnert

[11] 4,106,788
[45] Aug. 15, 1978

[54] HOE DRILL CARRIER

[76] Inventor: Darrell F. Bohnert, Jewell, Kans. 66949

[21] Appl. No.: 803,528

[22] Filed: Jun. 6, 1977

[51] Int. Cl.² .................................. A01B 63/22
[52] U.S. Cl. .......................... 280/43.23; 172/413; 172/625
[58] Field of Search ............ 172/240, 315, 316, 413, 172/625, 668; 280/43, 43.11, 43.13, 43.16, 43.17, 43.19, 43.22, 43.23, 415 R, 415 A; 403/231, 401, 402

[56] References Cited

U.S. PATENT DOCUMENTS

| | | | |
|---|---|---|---|
| 1,758,955 | 5/1930 | Lovejoy | 403/231 X |
| 3,288,480 | 11/1966 | Calkins et al. | 280/43.23 |
| 3,322,292 | 5/1967 | Bogh et al. | 280/43.11 X |
| 3,610,661 | 10/1971 | Pierce et al. | 280/415 R |

FOREIGN PATENT DOCUMENTS 51,476  1/1968  German Democratic Rep. ..... 172/240

Primary Examiner—Richard T. Stouffer
Attorney, Agent, or Firm—John H. Widdowson; Edwin H. Crabtree

[57] ABSTRACT

A hoe drill carrier for mounting on the rear of a hoe drill and raising the rear of the drill including the press wheels of the hoe drill above the ground surface. The carrier co-acting with the front wheels of the hoe drill in transporting the hoe drill on a highway, dirt road or the like. A plurality of carriers may be attached individually to a hoe drill made up of several sections. When the hoe drill is made up of more than one section, the drill is too wide to transport front ways down the highway. The carrier allows the multi-section hoe drill to be transported down a highway laterally.

4 Claims, 5 Drawing Figures

HOE DRILL CARRIER

BACKGROUND OF THE INVENTION

This invention relates generally to a carrier for transporting a farm implement and more particularly, but not by way of limitation, to a carrier mounted on the rear of a hoe drill for raising the press wheels of the hoe drill above the ground surface so that the hoe drill may be transported front ways or laterally.

Heretofore, there have been many types of trailers, carriers, and other types of wheeled frames used in conjunction with farm implements to aid in transporting the farm implements laterally because the overall width of the farm implement exceeds the maximum width allowed by law in transporting a vehicle on a highway or road.

The prior art trailers and carriers have included various types of mechanical lifting means, hydraulic cylinders, and air operated cylinders for raising the farm implement on the carrier.

None of the prior art carriers and trailers disclose the novel structure of the subject invention and the advantages of the invention as described herein.

SUMMARY OF THE INVENTION

The subject hoe drill carrier is attached to each hoe drill section and eliminates the need of having to take apart the individual drill sections in transporting the hoe drill from one location to the other. The invention can also be used with a single section hoe drill. The carrier eliminates transporting the hoe drill on the press wheels which are not made for highway travel thereby eliminating excessive wear on the press wheels.

The carrier allows a multi-section hoe drill to be transported laterally or end to end on a highway thereby greatly reducing the time in transporting the hoe drill from one location to another. By allowing the hoe drill to be transported laterally, the danger of transporting the hoe drill which exceeds the overall width requirement of a vehicle on the highway is eliminated.

The hoe drill carrier can be quickly mounted on the rear of various types of hoe drills. The carrier is raised and lowered hydraulically by a hydraulic cylinder which is attached to the hydraulic system of the tractor pulling the hoe drill. The invention is lightweight and rugged in construction. Because of its lightweight, the carrier may be left on the individual sections of the hoe drill while the hoe drill is in farm use. When it is desired to transport the hoe drill, caster wheels mounted on the carrier are lowered to the ground surface raising the press wheels of the hoe drill above the ground surface and allowing the pulling vehicle to pull the hoe drill frontwise if it is a single section hoe drill or laterally if it is a multi-section drill.

The hoe drill carrier includes a carrier frame mounted on the rear of the hoe drill and disposed above the press wheels of the hoe drill. A rock shaft is pivotally mounted on the frame with the shaft disposed parallel to the width of the hoe drill. A pair of lift arms are mounted at each end of the rock shaft and are perpendicular thereto. The lift arms extend rearwardly and downwardly from the frame. A pair of caster wheels are mounted on the ends of the lift arms. A hydraulic cylinder is mounted on the frame and attached to the rock shaft. When the hydraulic cylinder is extended, the rock shaft is raised thereby pivoting the lift arms with the caster wheels attached thereto downwardly. When the caster wheels contact the ground surface, the rear of the hoe drill including the press wheels is raised above the ground surface thereby allowing the hoe drill to be transported on the caster wheels of the hoe drill carrier and the standard caster wheels mounted on the front of the hoe drill. A single hoe drill section may be transported frontwise down a highway without exceeding the overall width requirement of a vehicle on the highway. Should the hoe drill be made up of two or more sections, then a plurality of hoe dril carriers are mounted on the hoe drill with a single carrier for each section of the hoe drill. The caster wheels of the carrier and the hoe drill are pivoted 90° and the hoe drill and carriers are pulled laterally on the highway.

The advantages and objects of the invention will become evident from the following detailed description when read in conjunction with the accompanying drawings which illustrate the preferred embodiments of the invention.

DETAILED DESCRIPTION OF THE DRAWINGS

Figure 1:
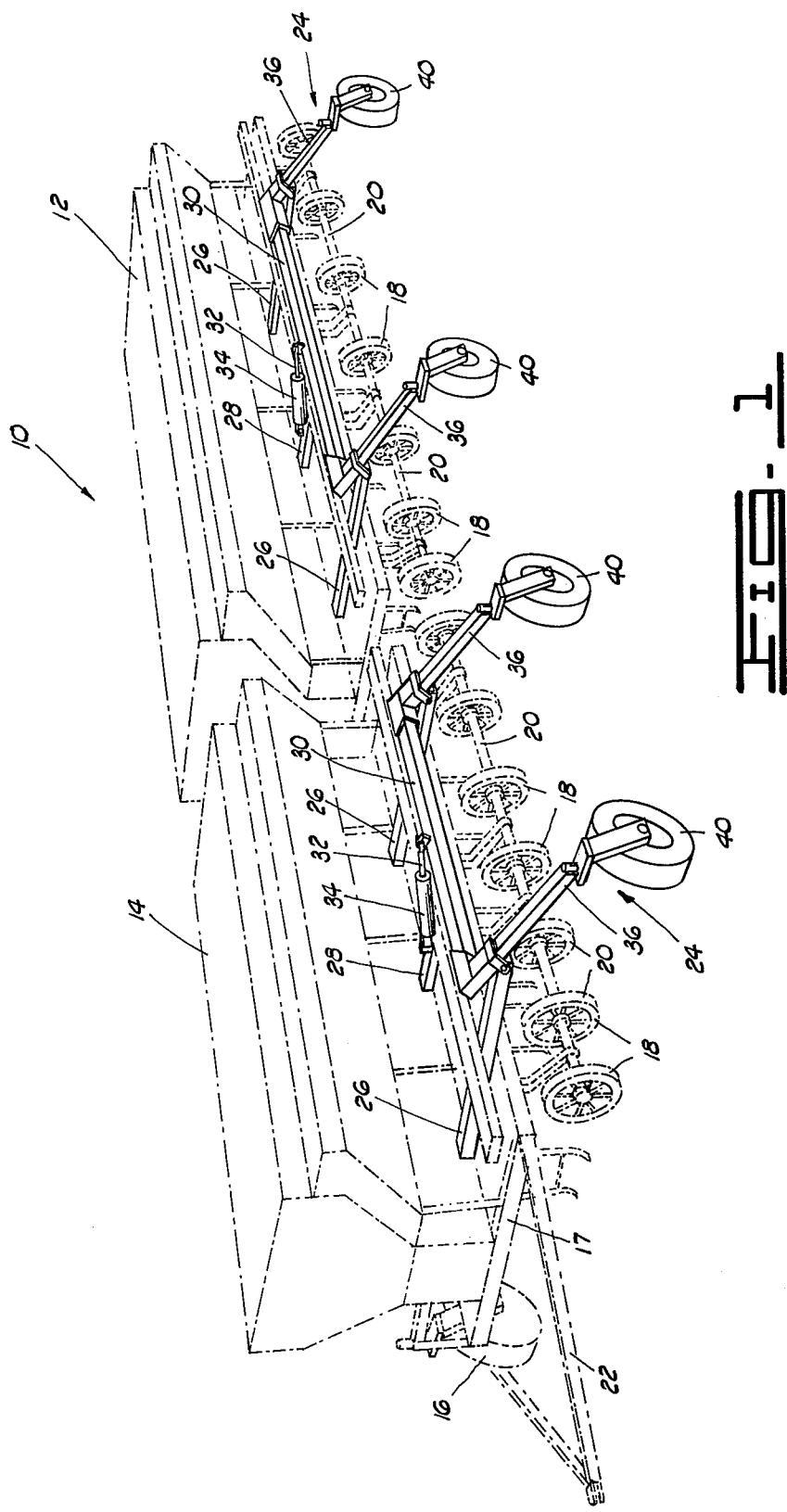
FIG. 1 is a perspective view of a hoe drill with two hoe drill sections having a hoe drill carrier attached to each section of the hoe drill.

In FIG. 1, a standard type of hoe drill is illustrated and is designated by general reference numeral 10. The hoe drill includes a pair of hoe drill sections 12 and 14. In the planting of various types of crops using a hoe drill 10, an individual section may be pulled by a tractor or more than one section may be attached end to end thereby increasing the overall width of the hoe drill 10 so that the time required in planting is decreased.

The hoe drill sections 12 and 14 include hoe drill caster wheels 16 which are mounted in the front of the sections 12 and 14. In this illustration, only one of the wheels 16 can be seen. Disposed below the rear of a hoe drill frame 17 are a plurality of press wheels 18 mounted on a press wheel axle 20 which is disposed parallel to the width of the hoe drill sections 12 and 14. Attached to one end of the hoe drill section 14 is a draw bar 22 which is used for pulling the hoe drill 10 laterally.

While the overall width of a section of a hoe drill does not exceed the maximum width in transporting a vehicle on the highway, the coupling of sections 12 and 14 does exceed the overall width requirement on a highway. Also, a third and fourth section may be added to the hoe drill thereby further increasing the width of the hoe drill. Because it takes a great deal of time to couple and uncouple the hoe drill sections from each other, it is desirable to transport the hoe drill 10 laterally when more than one hoe drill section is attached to another.

The hoe drill carrier which allows the hoe drill 10 to be transported frontways or laterally is designated by general reference numeral 24. In this illustration, there are two hoe drill carriers 24. One is attached to the hoe drill section 12 and the other is attached to the hoe drill section 14.

The hoe drill carrier 24 includes a pair of elongated mounting brackets 26 which are parallel to each other and mounted on the rear of the hoe drill frame 17. The mounting brackets 26 are perpendicular to the width of the hoe drill sections 12 and 14 and extend rearwardly and above the press wheel 18. A hydraulic cylinder mounting bracket 28 is attached to the frame 17 and is parallel and disposed between the two mounting brackets 26.

Pivotally mounted at the rear end of the mounting brackets 26 is an elongated rock shaft 30 which is disposed parallel to the width of the hoe drill sections 12 and 14. The rock shaft 30 is attached to a hydraulic ram 32 which is part of a hydraulic cylinder 34 attached to the hydraulic cylinder mounting bracket 32. Extending outwardly and downwardly from the rock shaft 30 and attached at both ends of the rock shaft 30 are a pair of lift arms 36. Caster wheels 40 are pivotally mounted on the ends of the lift arms 36.

The hydraulic cylinder 34 is attached to and driven by the hydraulic system of the vehicle used in pulling the hoe drill 10. When the hydraulic cylinder 34 is activated and the hydraulic ram 32 of the hydraulic cylinder 34 is extended outwardly, the rock shaft 30 is moved upwardly rotating the lift arms 36 downwardly thereby lowering the caster wheels 40 to the ground surface. When the caster wheels 40 contact the ground surface, the hydraulic ram 32 continues to raise the rock shaft 30 which in turn lifts the rear of the frame 17 and the press wheels 18 attached thereto until they are raised above the ground surface. When the press wheels 18 have been raised above the ground surface, the pulling vehicle is attached to the tow bar 22 and as the hoe drill 10 and carriers 24 are moved, the caster wheels 16 and the caster wheels 40 rotate 90° thereby allowing the hoe drill 10 to be transported on the carriers 24 laterally.

Figure 2:
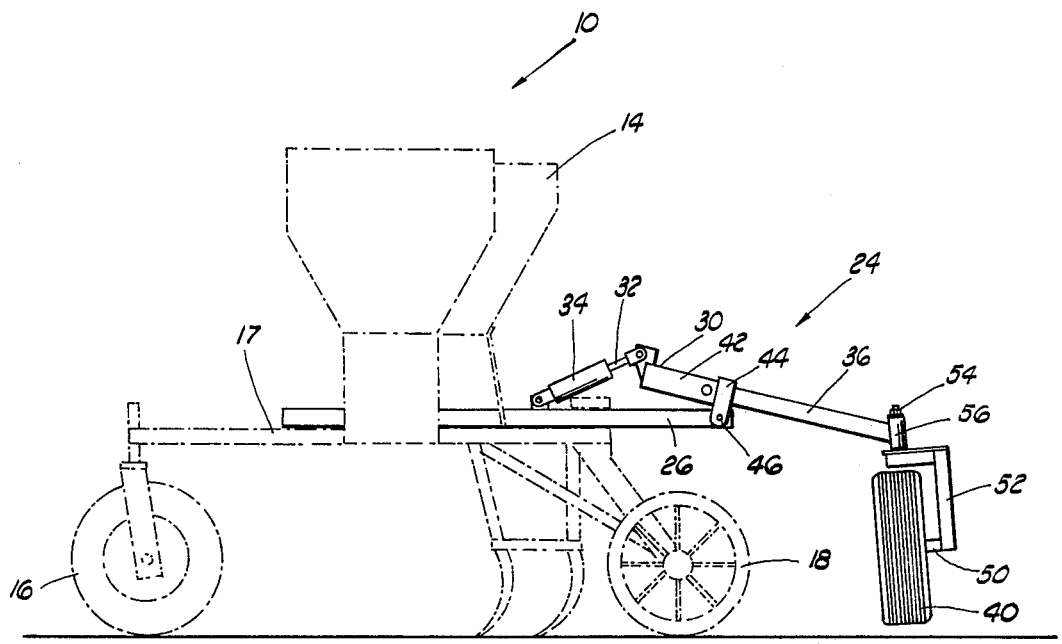
FIG. 2 is an end view of the hoe drill with the hoe drill carrier in a raised position.

In FIG. 2, the hoe drill carrier 24 is illustrated with the caster wheels 40 in a raised position above the ground surface. The hoe drill 10 is shown in the normal field use position wherein the drill 10 is moved forward for planting various types of crops. Because of the lightweight and simple design of the carrier 24, it does not interfere with the normal use of the hoe drill 10 and therefore does not need to be removed when not required to transport the hoe drill 10. In this view, the hydraulic cylinder 34 can be seen with the hydraulic ram 32 in a retracted position thereby lowering the rock shaft 30 which in turn pivots the lift arms 36 upwardly about a pivot point on the end of the mounting brackets 26. The ends of the rock shaft 30 are connected to the lift arms 36 by a tubular "L" shaped lift arm connector 42. The lower end of the connector 42 includes an inverted "U" shaped pivot strap 44. The ends of the strap 44 include apertures for receiving a pivot pin 46 through the strap 44 and through the end of the mounting brackets 26. As the rock shaft 30 is raised by the hydraulic ram 32, the lift arms 36 attached to the ends of the rock shaft 30 rotate in a clockwise direction about the pivot pin 46.

Figure 3:
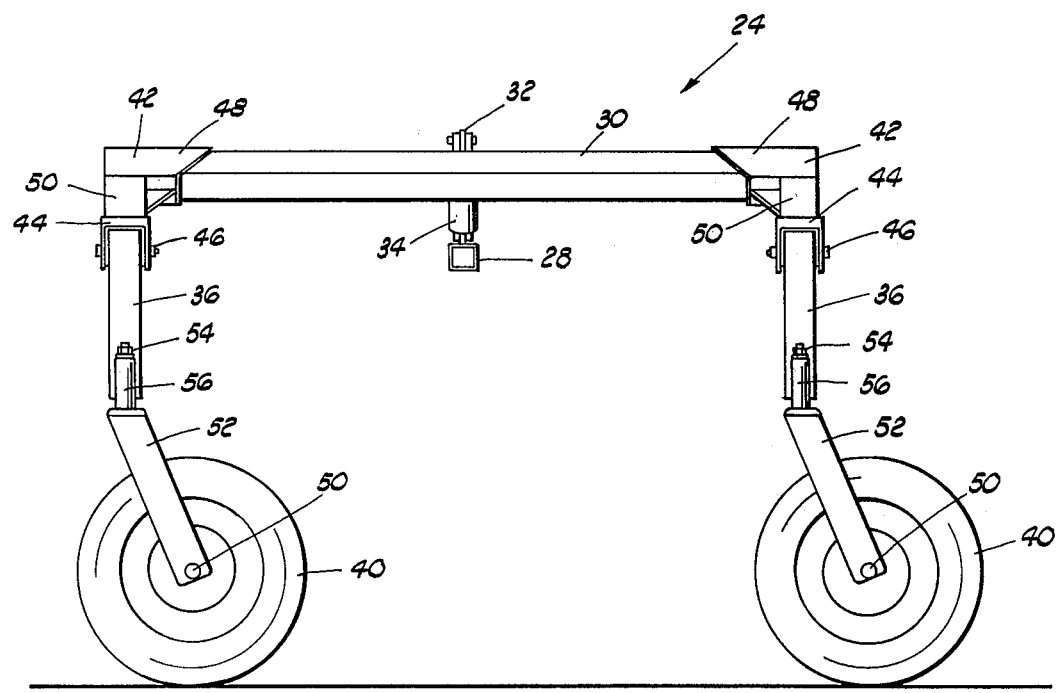
FIG. 3 is a rear view of a hoe drill carrier.

In FIG. 3, a rear view of the hoe drill carrier 24 is illustrated. In this illustration, the "L" shaped lift arm connectors 42 can be seen wherein the ends of the rock shaft 30 are inserted in upper ends 48 of the connector 42 with the lift arms 36 inserted in lower ends 50 of the connectors 42.

In this figure, the caster wheels 40 can be seen lowered to the ground surface and in position for transporting the hoe drill 10 laterally. The caster wheels 40 include a wheel axle 50 which is attached to the lower end of a "L" shaped wheel arm 52. The wheel arm 52 is disposed beside the wheel and on top of the wheel 40. The top of the wheel arm 52 includes an upwardly extending bearing pin 54 which is inserted inside a bearing collar 56 which is attached to the end of the lift arms 36.

Figure 4:
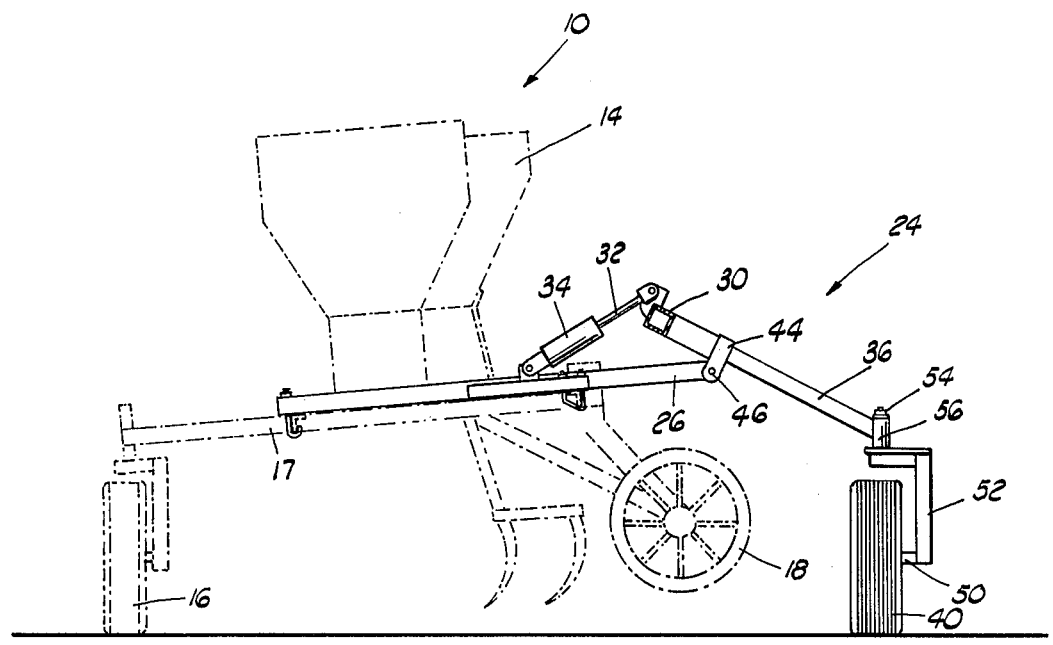
FIG. 4 is an end view of the hoe drill similar to FIG. 2 but with the hoe drill carrier in a lowered position with the rear of the hoe drill raised and ready for being transported laterally.

In FIG. 4, a side view of the hoe drill 10 and carrier 24 is illustrated with the hydraulic ram 32 of the hydraulic cylinder 34 in an extended position. The ram 32 has raised the rock shaft 30 which in turn has lowered the caster wheels 40. By pivoting the lift arms 36 in a clockwise direction on the pivot pins 46, the caster wheels 40 contact the ground surface and raise the rear of the frame 17 and the press wheels 18 above the ground surface. In this position, the hoe drill 10 and carrier 24 are moved rotating the caster wheels 16 and 40 90 degrees so that the hoe drill 10 and carrier 24 are ready for transporting the hoe drill 10 laterally on a highway.

Figure 5:
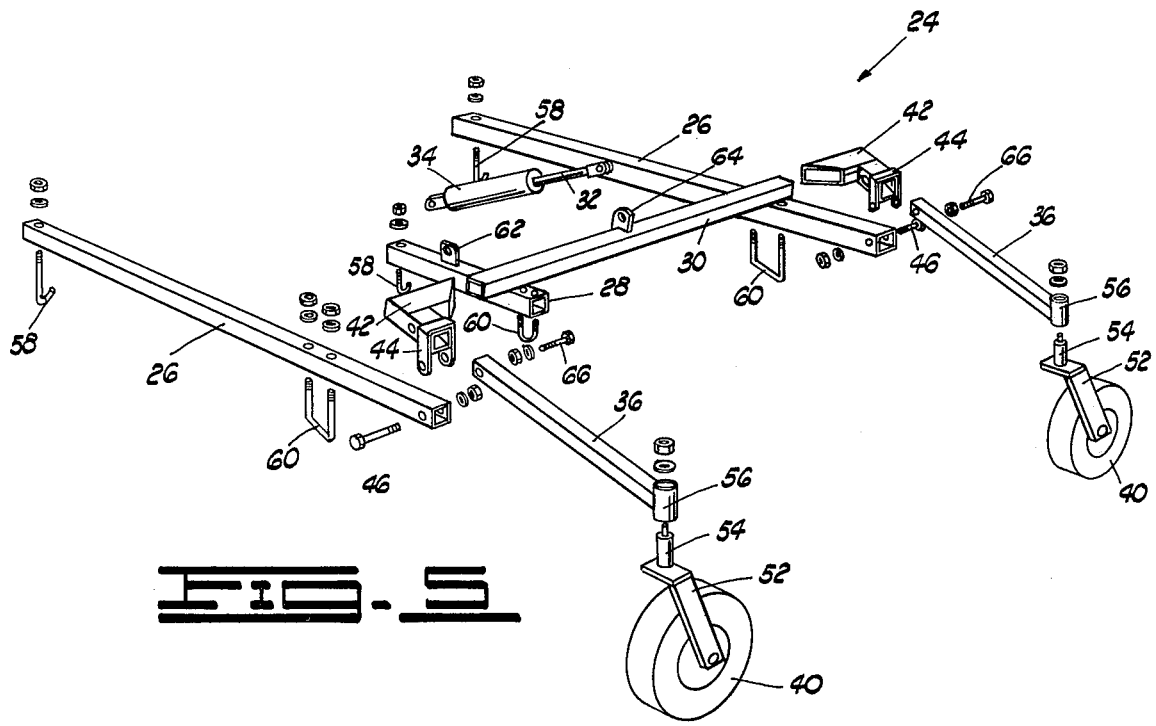
FIG. 5 is an exploded view of the individual parts of the hoe drill carrier.

In FIG. 5, an exploded view of the hoe drill carrier 24 is illustrated. The front end of the mounting brackets 26 and hydraulic cylinder mounting bracket 28 are attached to the hoe drill frame 17 by hook bolts 58. A rear portion of the mounting brackets 26 and the hydraulic cylinder mounting bracket 28 are secured to the frame 17 by "U" bolts 60. The hydraulic cylinder 34 is pinned to the hydraulic cylinder mounting bracket 28 by a mounting flange 62. The hydraulic ram 32 is pinned to the rock shaft 30 by a mounting flange 64.

The upper end of the lift arms 36 are pinned inside the "L" shaped connectors 42 by bolts 66. Also seen in this view is the inverted "U" shaped pivot strap 44 shown with apertures in the ends of the strap 44 for receiving the pivot pins 46 therethrough.

The lower end of the lift arms 36 can be seen with the bearing collar 56 in a position for receiving the bearing pin 54 therein so that the caster wheels 40 can freely rotate on the ends of the lift arms 36.

Changes may be made in the construction and arrangement of the parts or elements of the embodiment as disclosed herein without departing from the spirit or scope of the invention as defined in the following claims.

I claim:

1. A hoe drill carrier for mounting on the rear of a hoe drill, the carrier co-acting with the front wheels of the hoe drill in transporting the hoe drill, the carrier comprising:

a pair of horizontal stationary mounting brackets for mounting on the rear of the hoe drill and disposed parallel to each other, said brackets adapted to be disposed perpendicular to the width of the hoe drill, said mounting brackets having forward and rearward ends, the rearward ends of said mounting brackets adapted to extend outwardly from the rear of the drill;

an elongated rock shaft pivotally mounted on the rearward ends of said mounting brackets, said shaft adapted to be disposed parallel to the width of the hoe drill, said shaft further being disposed intermediate the forward and rearward ends of said brackets;

a pair of parallel lift arms having forward and rearward ends, said lift arms mounted on the ends of said rock shaft and perpendicular thereto, said lift arms extending rearwardly and downwardly from the rearward ends of said mounting brackets and extending below the level of said brackets;

a pair of caster wheels mounted on the rearward ends of said lift arms; a horizontal stationary hydraulic cylinder mounting bracket disposed parallel to said mounting brackets and therebetween, said hydraulic cylinder mounting bracket mounted on the rear of the hoe drill; and a hydraulic cylinder pivotally mounted on top of said hydraulic cylinder mounting bracket, the hydraulic ram of said hydraulic cylinder attached to said rock shaft for raising and lowering said rock shaft, such that when said shaft is raised, said caster wheels attached to the rearward ends of said lift arms are lowered downwardly contacting the ground surface and raising the rear of the hoe drill above the ground surface.

2. The carrier as described in claim 1, wherein said rock shaft is pivotally attached to the ends of said mounting brackets by a pair of tubular "L" shaped lift arm connectors, one end of said lift arm connectors slidably receiving the ends of said rock shaft therein, the other end of said connectors slidable receiving one end of said lift arms, said connectors including a "U" shaped pivot strap mounted therearound with the ends of said strap having apertures therein for receiving a pivot pin which is inserted through said strap and the ends of said mounting brackets so that said pivot strap may be pivoted on the ends of said mounting brackets.

3. The carrier as described in claim 1, wherein said caster wheels each include a wheel mounted on a wheel axle, one end of the axle attached to a "L" shaped wheel arm disposed beside and on top of the wheel, the top of the wheel arm having an upwardly extending bearing pin rotatably mounted in a bearing collar attached to the end of said lift arms, the pin rotating in the collar allowing the wheel to rotate 360° on the end of one of said lift arms.

4. A hoe drill carrier for mounting on the rear of a hoe drill, the carrier co-acting with the front wheels of the hoe drill in transporting the hoe drill, the carrier comprising:

a pair of horizontal stationary mounting brackets for mounting on the rear of the hoe drill and disposed parallel to each other, said brackets adapted to be disposed perpendicular to the width of the hoe drill, said mounting brackets having forward and rearward ends, the rearward ends of said mounting brackets adapted to extend outwardly from the rear of the drill;

an elongated rock shaft pivotally mounted on the ends of said mounting brackets, said shaft adapted to be disposed parallel to the width of the hoe drill;

a pair of tubular "L"-shaped lift arm connectors, one end of said lift arm connectors slidably receiving the ends of said rock shaft therein, said connectors including a "U"-shaped pivot strap mounted therearound with the ends of said strap having apertures therein for receiving a pivot pin which is inserted through said strap and the ends of said mounting brackets so that said pivot strap may be pivoted on the ends of said mounting brackets;

a pair of parallel lift arms having forward and rearward ends with the forward ends slidably received in the other end of said connectors, said lift arms extending rearwardly and downwardly from the rearward ends of said mounting brackets; and a pair of caster wheels, each said caster wheel including a wheel mounted on a wheel axle, one end of the axle attached to an "L"-shaped wheel arm disposed beside and on top of the wheel, the top of the wheel arm having an outwardly extending bearing pin rotatably mounted in a bearing collar attached to the rearward end of one of said lift arms, the pin rotating in the collar allowing the wheel to rotate 360° on said rearward end of said one lift arm.

* * * * *